United States Patent [19]
Bardon et al.

[11] Patent Number: 6,097,386
[45] Date of Patent: Aug. 1, 2000

[54] DATA PROCESSING SYSTEM HAVING CONTEXT SENSITIVE VISUAL FEEDBACK FOR USER INTERFACE CONTROLS AND METHOD THEREFOR

[75] Inventors: Didier Daniel Bardon, Austin; Richard Edmond Berry; Scott Harlan Isensee, both of Georgetown; Shirley L. Martin; John Martin Mullaly, both of Austin, all of Tex.

[73] Assignee: International Business Machines Corporation, Armonk, N.Y.

[21] Appl. No.: 08/814,748

[22] Filed: Mar. 7, 1997

[51] Int. Cl.$^7$ ...................................................... G06F 3/00
[52] U.S. Cl. ........................................... 345/333; 345/340
[58] Field of Search .................................... 345/333, 320, 345/327, 388, 329, 330, 331, 332, 340, 341, 342, 343, 344, 351, 352, 353, 348; 395/768

[56] References Cited

U.S. PATENT DOCUMENTS

| | | | |
|---|---|---|---|
| 5,261,044 | 11/1993 | Dev et al. ................................ | 395/159 |
| 5,434,965 | 7/1995 | Matheny et al. ........................ | 395/159 |
| 5,436,637 | 7/1995 | Gayraud et al. ........................ | 345/116 |
| 5,502,805 | 3/1996 | Anderson et al. ....................... | 395/148 |
| 5,550,967 | 8/1996 | Brewer et al. .......................... | 395/155 |
| 5,740,436 | 4/1998 | Davis et al. ............................. | 345/651 |
| 5,745,712 | 4/1998 | Turpin et al. ........................... | 345/333 |
| 5,748,927 | 5/1998 | Stein et al. .............................. | 345/333 |
| 5,751,271 | 5/1998 | Austötz et al. .......................... | 345/146 |
| 5,764,226 | 6/1998 | Consolatti et al. ...................... | 345/333 |

*Primary Examiner*—Steven Sax
*Attorney, Agent, or Firm*—Winstead Sechrest & Minick P.C.; Volel Emile, Esq.

[57] ABSTRACT

A data processing system (100) transforms the limited user interface toolkits currently in use in the software development industry to provide control interfaces which are sensitive to a user's operational context. The data processing system does not create control objects by assembling ready-made controls available in the user interface toolkit of the development system, but generates a control object which has a custom designed appearance that is relevant to the context of the action the control should perform, to the kind of object which includes the control, and to the type of data to which the control is applied. The data processing system performs these operations through the implementation of a methodology wherein a central processing unit of the data processing system identifies the control interfaces included in an object to be display on a display device (138). For each control interface included in the object to be displayed, the central processing unit determines whether the control interface is a custom design. If the control interface does not have a custom design, the data required for configuring the control interface is retrieved from a memory (116, 114) and displayed in accordance with the control interface provided by the development system. Conversely, if the control interface does have a custom design, data is retrieved from memory to configure the control interface in a manner desired by a designer of the graphical user interface. The data representing the object in the control interface, whether custom designed or standard, is then provided to a display adapter which transforms that data to enable a display device to display the object in the control interface.

11 Claims, 5 Drawing Sheets

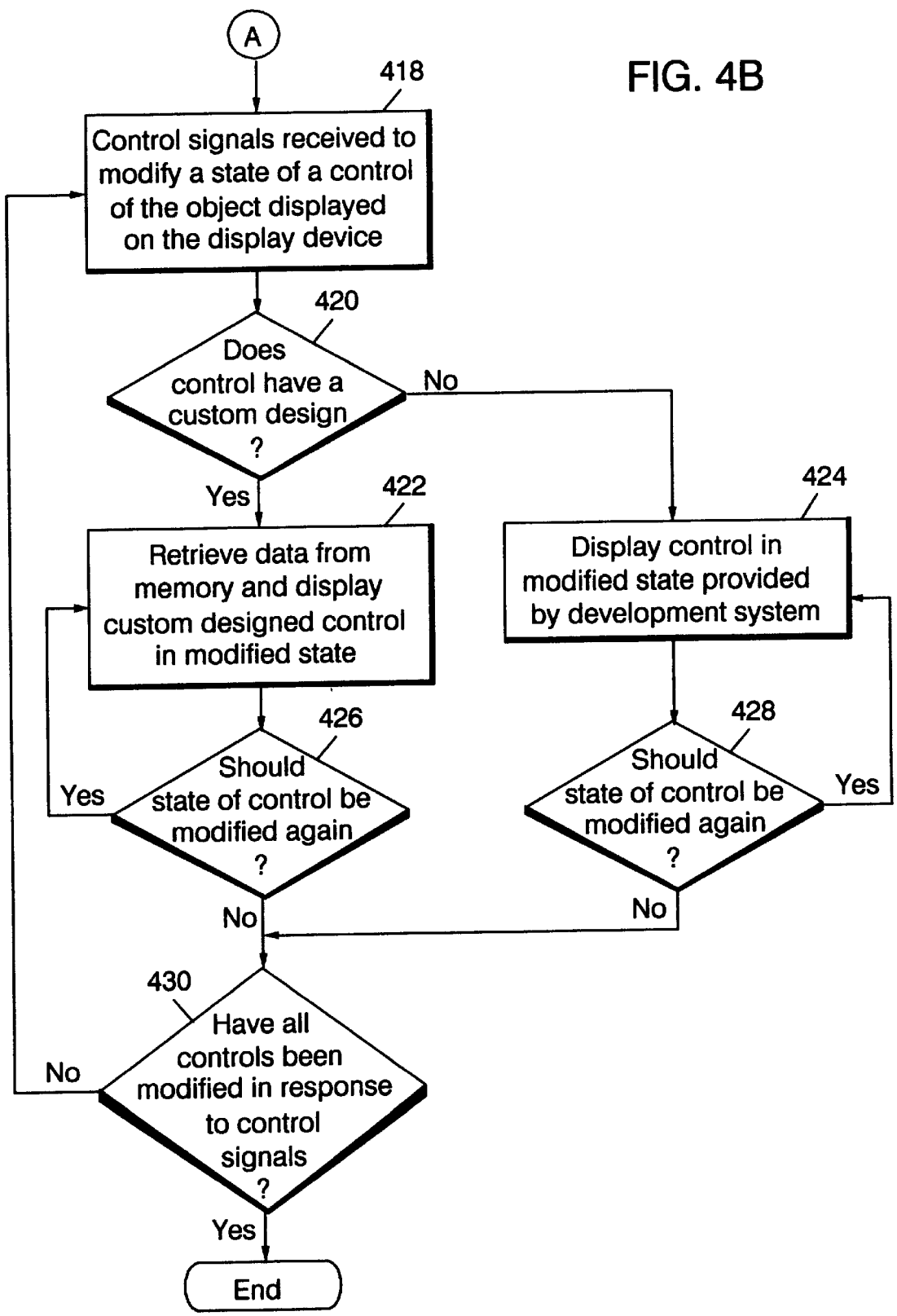

DATA PROCESSING SYSTEM HAVING CONTEXT SENSITIVE VISUAL FEEDBACK FOR USER INTERFACE CONTROLS AND METHOD THEREFOR

CROSS-REFERENCE TO RELATED APPLICATIONS

The present application is related to the following applications:

Ser. No. 08/753,081, entitled "CREATING REAL-WORLD OBJECTS";

Ser. No. 08/753,082, entitled "DATA PROCESSING SYSTEM AND METHOD FOR CONTROLLING A VIEW OF A REALISTIC OBJECT IN A DISPLAY DEVICE";

Ser. No. 08/753,077, entitled "PRIORITIZATION OF BACKGROUND DISPLAY DURING ANIMATION";

Ser. No. 08/753,122, entitled "MULTIFUNCTIONAL OBJECT";

Ser. No. 08/753,076, entitled "SYSTEM AND METHOD FOR MAINTAINING SIZE AND POSITION RELATIONSHIPS FOR NON-RECTANGULAR REAL-WORLD OBJECTS";

Ser. No. 08/753,124, entitled "DATA PROCESSING SYSTEM AND METHOD FOR SCALING A REALISTIC OBJECT ON A USER INTERFACE";

Ser. No. 08/753,078, entitled "DATA PROCESSING SYSTEM AND METHOD FOR VIEWING OBJECTS ON A USER INTERFACE";

Ser. No. 08/753,079, entitled "DATA PROCESSING SYSTEM AND METHOD FOR PERFORMING AUTOMATIC ACTIONS ON A GRAPHICAL USER INTERFACE"; and Ser. No. 08/753,123, entitled "DATA PROCESSING SYSTEM AND METHOD FOR MODIFYING A SIZE OF A REALISTIC OBJECT ON A USER INTERFACE".

All of the above applications were filed on Nov. 20, 1996, and are assigned to the assignee of the present patent application.

TECHNICAL FIELD

The present invention relates in general to data processing systems, and in particular, to graphical user interfaces in a data processing system.

BACKGROUND INFORMATION

As computers have developed to provide greater capabilities at greater speeds, the ability of a user to interface with that computer has also become much simpler. For example, icons provide a pictorial representation of a function which may be executed by a computer and allow a user to easily access that finction with a simple click of a mouse or a stroke of a return key. Additionally, many current software programs use realistic representations of objects to take advantage of a user's experience with the physical world. Therefore, rather than present the user with a series of panels and window frames or pull down menus, a software program for implementing an application may present a realistically-rendered object which is placed directly on a desktop or other environment.

While such realistic representations enable a user to more easily interface with the computer, the applications which implement the realistically-rendered objects introduce several difficulties. For example, the ability to display objects having realistically-rendered control options adds additional challenges for designers of the user interface of a computer system. Traditional development systems include a standard user interface toolkit wherein each control option has a standard view. Furthermore, traditional development systems only allow an interface to be implemented using a limited and finite set of views. For example, a typical development system allows an interface designer to implement scroll bars to allow a user to modify a view displayed on a display device of the computer system. Additionally, the typical development system provides slider controls and buttons to allow a user to access certain portions of an object being displayed or to perform certain functions, but does not allow other more intuitive control options. Each of the controls implemented in the standard user interface provided by a traditional development system does not generally allow a user to know what action is to be performed intuitively when one of the finite control options is implemented, displayed to the user on a display device and selected. For example, a scroll bar on a realistically-rendered telephone has no real-world counterpart and, therefore, a function associated with that scroll bar may not be intuitive to a user or the user may automatically associate a scroll bar with a volume control f/unction as that is a most likely association in a telephone context.

Therefore, there is a need to implement realistic control options in traditional development systems. As traditional development systems fail to provide support or implementing such control options, a need arises to implement control options on realistically-rendered objects wherein the function associated with the control option is intuitive to an external user.

SUMMARY OF THE INVENTION

The previously mentioned needs are fulfilled with the present invention. Accordingly, there is provided, in a first form, a data processing system. The data processing system includes a user interface for receiving a plurality of control inputs for selectively enabling a first one of a plurality of applications. The first one of the plurality of applications has an object representation and a first control interface. The data processing system also includes a first standard for storing a first plurality of data values corresponding to a first standard control interface, wherein the first plurality of data values corresponds to each of the plurality of applications. The data processing system also includes a second memory for storing a second plurality of data values correspond to the first control interface. The second plurality of data values corresponds to a portion of the plurality of applications. The data processing system also includes a data processor which includes a central processing unit. The central processing unit is connected to the first memory for receiving the first plurality of data values and is connected to the second memory for receiving the second plurality of data values. The central processing unit detects the first control interface of the object representation and selectively provides one of the first plurality of data values and the second plurality of data values to indicate a visual representation of the first control interface.

Additionally, there is provided, in a second form, a method for operating a data processing system, the method includes the steps of receiving a first plurality of control inputs at a user interface for enabling a first one of a plurality of applications having a first control interface for performing a first control function. A central processing unit is enabled to detect when a first control interface is one of a custom control interface and a standard control interface. The central processing unit is connected to the user interface. The method also includes a step of retrieving a first plurality of data values from a development system standard tool kit when the first control interface is the standard control interface. The method also includes a step of retrieving a second plurality of data values from a memory when the first control interface is the custom control interface.

Additionally, there is provided, in a third form, a program storage device readable by a machine, tangibly embodying a program of instructions executable by the machine to perform method steps for providing custom control interfaces in a data processing system. The method steps performed by the program storage device include receiving a first plurality of control inputs at a user interface for enabling a first one of a plurality of applications having a first control interface for performing a first control function. The method steps also include a step of enabling a central processing unit to detect when the first control interface is one of a custom control interface and a standard control interface. The central processing unit is connected to the user interface. Furthermore, the method includes the steps of retrieving a first plurality of data values from a development system standard tool kit when the first control interface is the standard control interface and of retrieving a second plurality of data values from a memory when the first control interface is the custom control interface.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 4-B illustrates, in flow diagram form, a second portion of the methodology of FIG. 4-A.

DETAILED DESCRIPTION

Figure 1:
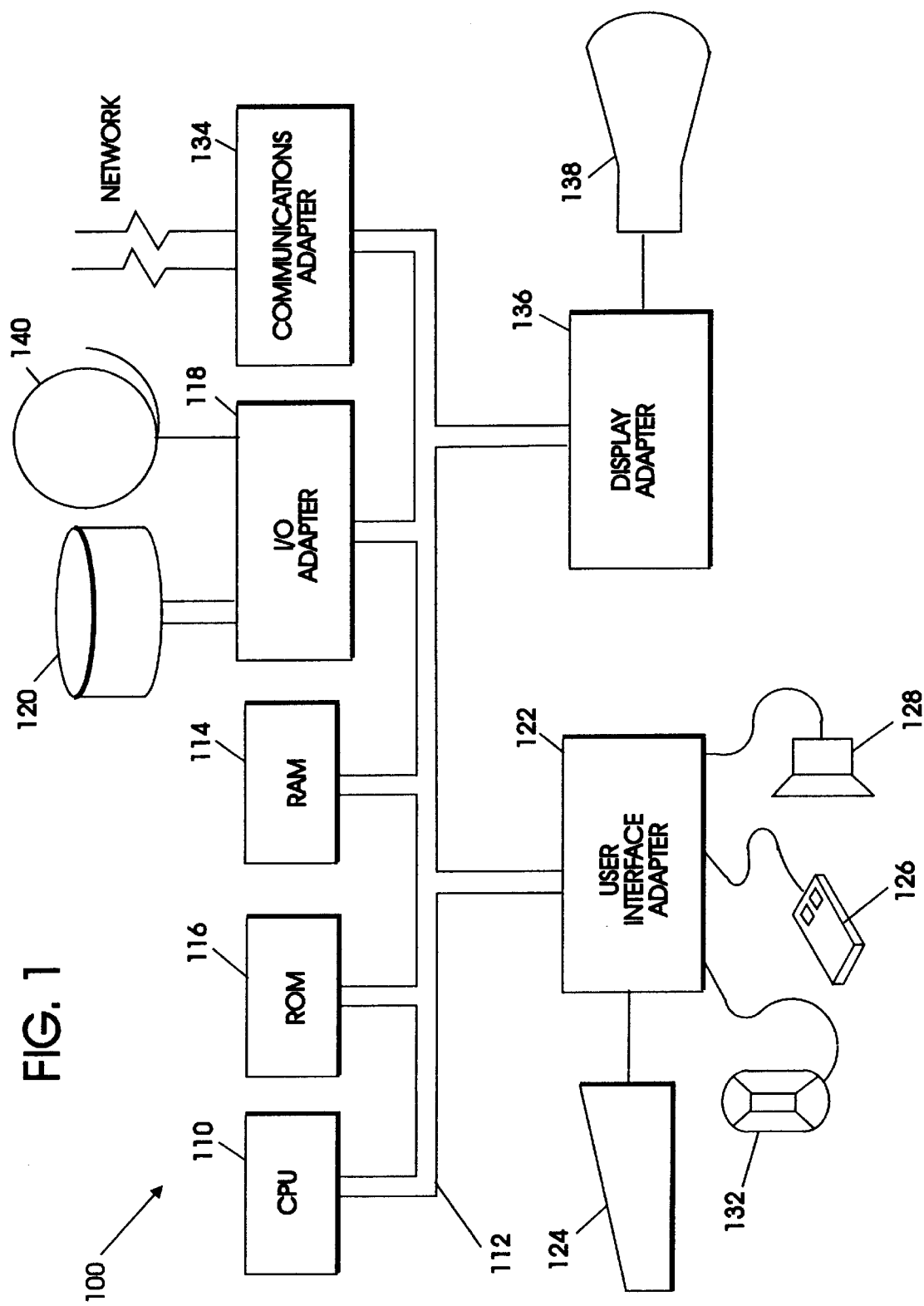
FIG. 1 illustrates, in block diagram form, a data processing system in accordance with one embodiment of the present invention.

The present invention provides a data processing system, software program, and method for allowing a user of a graphical user interface to provide control interfaces which are not supported by a standard toolkit of a development system in which they are implemented. The ability to create graphical user control interfaces which are not provided in the development system results from the implementation of a methodology for separating a model of a control function to be performed from a view of the control function displayed on a display device of the data processing system. This model/view separation allows a designer to create many different appearances, or views, for a small set of simple user interface controls, or models. Thus, the ability of the present invention to modify a user interface to perform a same function as is performed in a standard toolkit allows for the delivery of informative and intuitive feedback to an external user and is sensitive to an operational context of the controls themselves.

In the present invention, this methodology is implemented by displaying each control in a view which has a "custom designed" appearance that is relevant to the context of the application it performs, to the kind of object that it is implemented within, and to the kind of data to which it receives. Therefore, instead of creating object views by assembling ready-made controls available in a user interface toolkit, an appearance of the control is chosen to be consistent with the object metaphor displayed to the external user. For example, the action of picking up a call on a telephone object displayed on a display device may be implemented in the present invention with a simple two-state control visualized as a real telephone handset. In a first state, the telephone handset appears in a resting position on the telephone and in a second position, the telephone handset will appear in an upturned position such as that which would be utilized in a real-world telephone. Thus, in this example the user clicks a mouse or engages the handset to pick up an incoming telephone call. To provide visual feedback to a user that the call is being answered, the control's appearance is modified to appear as though the handset is turned up towards the user and floating in space off a cradle of the telephone. To end a telephone call, the user again clicks the mouse or engages the handset using a well-known interface methodology. As visual feedback, the handset is returned to the cradle as one would in a real-world telephone.

Such a custom design control interface is informative in several ways. First, such a control interface capitalizes on a user's previous knowledge of real-world telephones. Indeed, the handset is typically used to answer a call on a real-world telephone. Such control gives direct visual feedback of a state of a telephone line. Furthermore, when using the methodology of the present invention, the direct visual feedback of the control is unique to the object for which it is implemented. Therefore, in the case described above, the up-turned handset is unique to the telephone object. Stated another way, an appearance of the telephone handset should not look like another two-state control in another object in another domain. The operation and implementation of the present invention will subsequently be described in greater detail.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

A representative hardware environment for practicing the present invention is depicted in FIG. 1. Referring first to FIG. 1, an example is illustrated of a data processing system 100 which may be used to implement one embodiment of the present invention. The system has a central processing unit (CPU) 110, such as a PowerPC microprocessor ("PowerPC" is a trademark of IBM Corporation) according to "The PowerPC Architecture: A Specification for a New Family of RISC Processors", 2d edition, 1994, Cathy May, et al. Ed., which is hereby incorporated herein by reference. A more specific implementation of a PowerPC microprocessor is described in the "PowerPC 604 RISC Microprocessor Users Manual", 1994, IBM Corporation, which is hereby incorporated herein by reference. The history buffer (not shown) of the present invention is included in CPU 110. The CPU 110 is coupled to various other components by system bus 112. Read only memory ("ROM") 116 is coupled to the system bus 112 and includes a basic input/output system ("BIOS") that controls certain basic functions of the data processing system 100. Random access memory ("RAM") 114, I/O adapter 118, and communications adapter 134 are also coupled to the system bus 112. I/O adapter 118 may be a small computer system interface ("SCSI") adapter that communicates with a disk storage device 120. Communications adapter 134 interconnects bus 112 with an outside network enabling the data processing system to communication with other such systems. Input/Output devices are also connected to system bus 112 via user interface adapter 122 and display adapter 136. Keyboard 124, track ball 132, mouse 126 and speaker 128 are all interconnected to bus 112 via user interface adapter 122. Display monitor 138 is connected to system bus 112 by display adapter 136. In this manner, a user is capable of inputting to the system throughout the keyboard 124, trackball 132 or mouse 126 and receiving output from the system via speaker 128 and display 138. Additionally, an operating system such as AIX ("AIX" is a trademark of the IBM Corporation) is used to coordinate the functions of the various components shown in FIG. 1.

Preferred implementations of the invention include implementations as a computer system programmed to execute the method or methods described herein, and as a computer program product. According to the computer system implementation, sets of instructions for executing the method or methods are resident in the random access memory 114 of one or more computer systems configured generally as described above. Until required by the computer system, the set of instructions may be stored as a computer program product in another computer memory, for example, in disk drive 120 (which may include a removable memory such as an optical disk or floppy disk for eventual use in the disk drive 120). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change. While it is convenient to describe the invention in terms of instructions, symbols, characters, or the like, the reader should remember that all of these and similar terms should be associated with the appropriate physical elements.

Note that the invention describes terms such as comparing, validating, selecting or other terms that could be associated with a human operator. However, for at least a number of the operations described herein which form part of the present invention, no action by a human operator is desirable. The operations described are, in large part, machine operations processing electrical signals to generate other electrical signals.

As has previously been described, data processing system 100 of the present invention transforms the limited user interface toolkits currently in use in the software development industry to provide control interfaces which are sensitive to a user's operational context. The present invention creates a more intuitive and readily recognizable control interface by allowing a designer to create many different appearances or views for the small set of simple user interface controls traditionally provided by software development systems in the industry. As previously mentioned, the present invention does not create control objects by assembling ready-made controls available in a user interface toolkit of a development system, but generates a control object which has a "custom designed" appearance and behavior that is relevant to the context of the action the control should perform, to the kind of object which includes the control, and to the type of data to which the control is applied.

Figure 2:
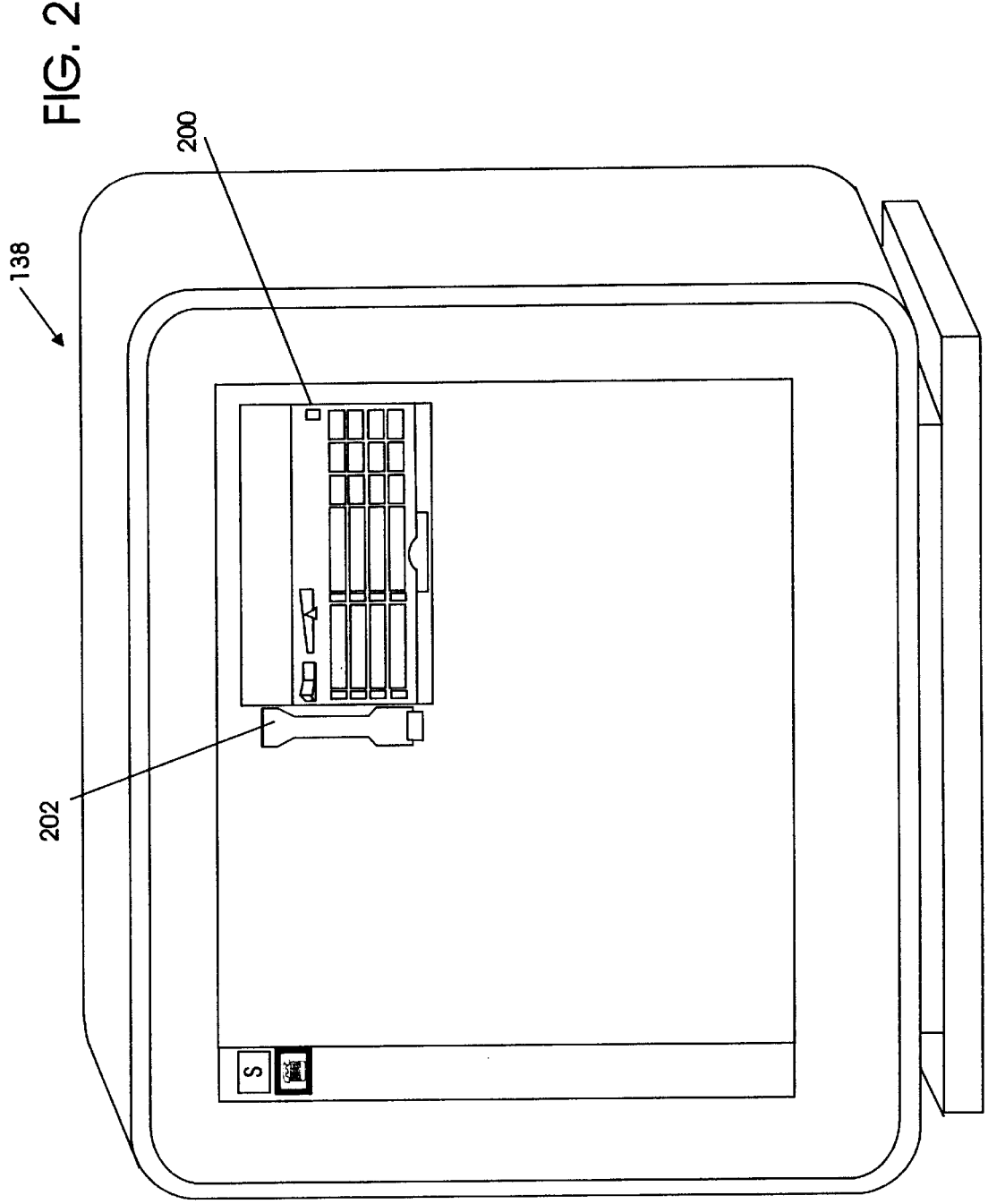
FIG. 2 illustrates, in block diagram form, a display device in accordance with one embodiment of the present invention.

FIG. 2 provides an illustrative example of such custom design control interfaces. FIG. 2 illustrates a display device which displays a telephone 200 having an handset 202. It should be noted that telephone 200, and any other objects which may be illustrated on display device 138 are determined by a remaining portion of data processing system 100. For example, CPU 110 controls the data communicated between display adapter 136 and both ROM 116 and RAM 114 to determine an object displayed on display device 138. In display device 138 of the present invention, a telephone application has been enabled by CPU 110. To indicate that telephone 200, while enabled, is not being used or accessed by an external user at this point in time, telephone handset 202 remains down-turned in a first state. This placement of telephone handset 202 in a first state indicates that telephone 200 is not being used by an external user to communicate with an incoming or outgoing caller.

Figure 3:
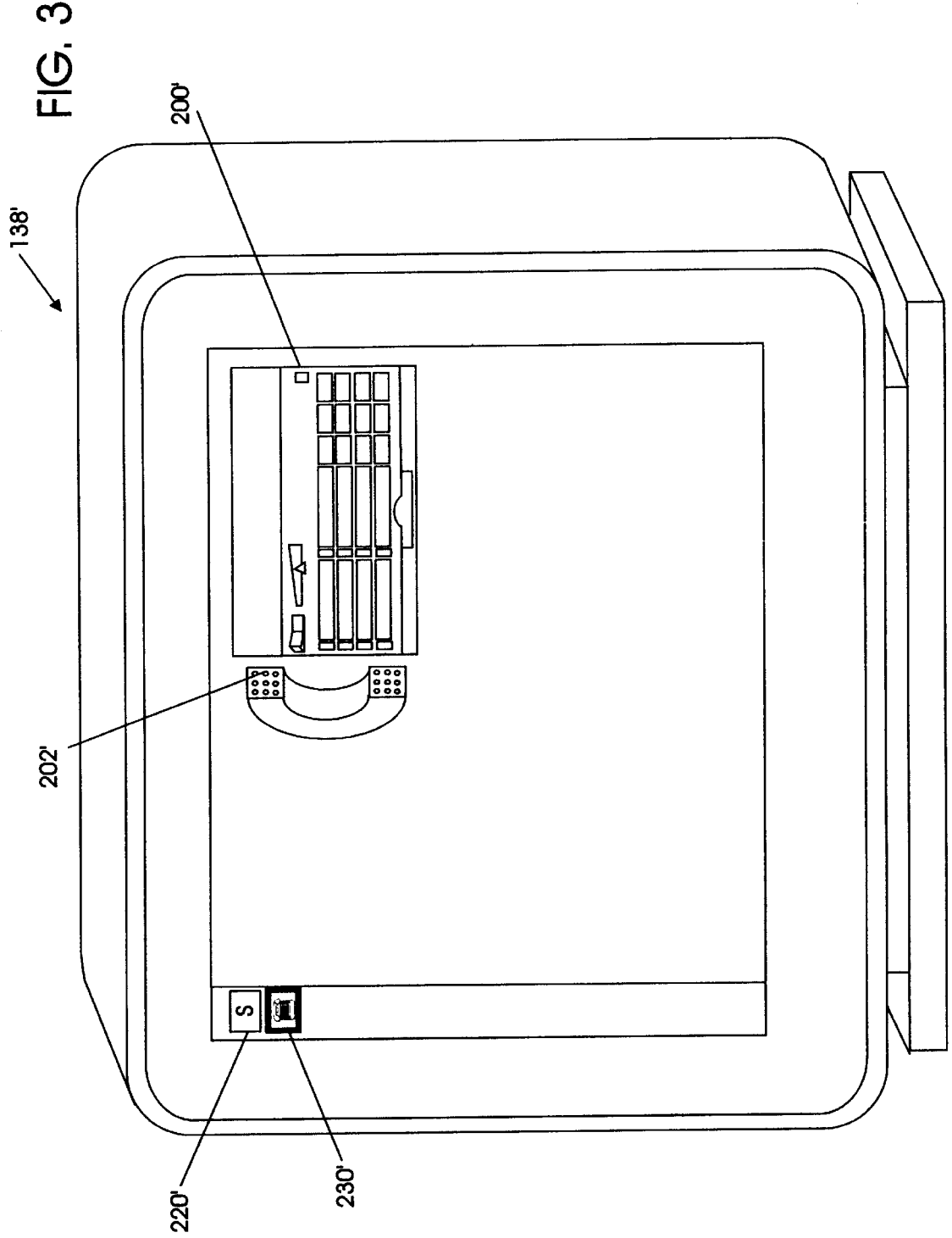
FIG. 3 illustrates, in block diagram form, a display device in accordance with embodiment of the present invention.

FIG. 3 again illustrates display device 138 and the objects illustrated thereon. In FIG. 3, telephone 200 is in a second state, as reflected by telephone handset 202' being in a second state. Telephone handset 202' is in the second state to visually indicate that telephone 200 is being used to either answer an incoming call or to place an outgoing call. As in the real-world, the telephone handset 202' must be turned over and removed from its resting place on a telephone to allow a use to either place or answer a call.

FIGS. 2 and 3 illustrate the effectiveness and intuitiveness of the present invention. By utilizing a real-world object to indicate the telephone 200 is in a communicative or non-communicative state, a user is able to readily determine a state of telephone 200 based on their own real-world knowledge and experience. The ability of a user to rely on well-known states of objects is invaluable in generating a user-friendly graphical user interface currently desired in the data processing industry. It should be noted that if a traditional user interface toolkit included in a development system had been used to provide control indicating this communicative/non-communicative state of telephone 200, a push-button or other two-state control object would be used. As real-world telephone applications do not generally have push-buttons, to answer or place a telephone call, the use of such a symbol would not allow a user to intuitively understand how the telephone application is executed, scroll bars, or sliders, such as traditionally implemented in such user interface toolkits. The user of push-buttons would not readily allow a user to understand the manner in which a computer determines how the telephone application on display device 138 should be used to place an outgoing call or receive an incoming call. As the usefulness of the present invention has been described with respect to FIGS. 2 and 3, the methodology for implementing the present invention will subsequently be described in greater detail.

Figure 4A:
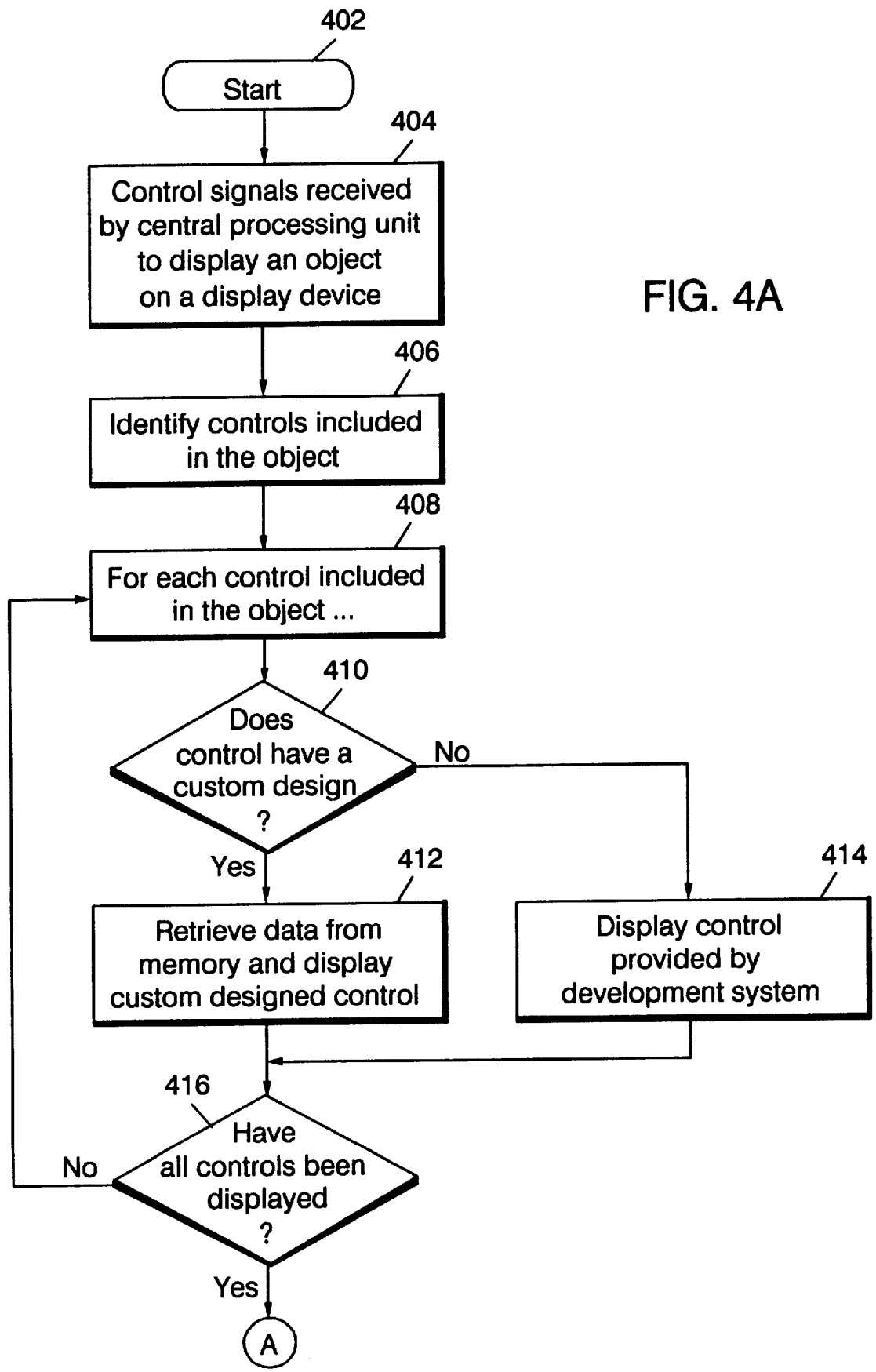
FIG. 4-A illustrates, in flow diagram form, a methodology for displaying a control object in a display device in accordance with one embodiment of the present invention.

FIG. 4-A illustrates a methodology implemented by CPU 110 of data processing system 100 to provide "custom designed" control interfaces in a development system which provides only a few ready-made controls in a user interface toolkit. Referring to FIG. 4-A, in a step 404, control signals are received by central processing unit 110 to display an object on display device 138. The control signals may be received from a user input device 126, 128, 124, or 132, or provided by a program stored in ROM 116 or RAM 114. Subsequently, in a step 406, CPU 110 identifies the control interfaces included in the object to be displayed on display device 138. CPU 110 identifies the control objects by querying an object's data structure in a memory of data processing system 100 for a list of its contained control objects.

For each control interface included in the object to be displayed on display device 138, the following steps are executed. In a step 410, CPU 110 determines whether the control interface has a custom design. CPU 110 determines the control interface has a custom design by accessing a flag in the object data structure which corresponds to the control interface list previously described. The flag is set to indicate whether the control interface has a custom design. If the control interface does not have a custom design, the data required for configuring the control interface is retrieved from ROM 116 or RAM 114 and displayed in accordance with the control interface provided by the development system in which data processing system 100 is implemented in a step 414. Conversely, if the control interface does have a custom design, data is retrieved from ROM 116 or RAM 114 to configure the control interface in a manner desired by a designer of the graphical user interface in step 412. Subsequently, data representing the object and the control interface, whether custom designed or standard, is provided to display adapter 136. Display adapter 136 subsequently transforms that data to enable display device 138 to display the object and the control interface. Steps 408–416 are repeated for each of the control interfaces to be displayed with the object. After all of the control interfaces in the object are displayed on display device 138, control signals may then be received to modify a state of one of the control interfaces of the object displayed on display device 138 in a step 418.

Next, in a step 420, it must be determined whether the control interface has a custom design. If the control interface does not have a custom design, CPU 110 accesses data reflecting a modified state of the control interface from ROM 116 or RAM 114. It should be noted that the data provided by these memory devices reflects a modified state of the control provided by the development system in which data processing system 100 is implemented (step 424). Next, in a step 428, it is determined whether the state of the control interface should be modified again. This step is provided for control interfaces which have more than the two states illustrated by the telephone handset of FIGS. 2 and 3.

Additionally, if the control interface does have a custom design, data corresponding to the modified state is retrieved from ROM 116 and RAM 114 so that the control interface may be displayed in a modified state. Subsequently, the data is provided to display adapter 136 which transforms that data and provides a modified custom design control interface to an external user via display device 138 in a step 422. Subsequently, it is next determined in a step 426 whether the state of the control interface should be modified again. Again, as stated above, the present invention contemplates a situation in which the control interface may have many states, and not just the two states illustrated in FIGS. 2 and 3.

Next, in a step 430, it must be determined whether or not all control interfaces have been modified in response to the control signals. If not, steps 420–430 are again repeated until all control interfaces have been modified to satisfy the control signals provided to CPU 110.

To provide additional clarification, the methodology of FIGS. 4-A and 4-B will be explained in the context of the telephone application illustrated in FIGS. 2 and 3. In this application, CPU 110 first receives control signals to display telephone 200 on display device 138. In the process of displaying telephone 200 on display device 138, CPU 110 must identify control interfaces of telephone 200 in a step 406. Assume in this case that the only control object is the telephone handset 202. In this case, telephone handset 202 is a custom signed control interface as it is not generally included in standard user interface toolkits of development systems. Therefore, when CPU 110 detects that telephone 200 has a custom design control interface, CPU 110 accesses the graphical information corresponding to telephone handset 202 from ROM 116 or RAM 114 instead of implementing a two-state control device provided in the standard user interface toolkit. It should be noted that if the control interface did not have a custom design, CPU 110 would access the proper control from ROM 116 or RAM 114. Subsequently, in a step 416, all control interfaces for telephone 200 have been displayed.

Now, referring to FIG. 3, assume that control signals are received to modify a state of telephone 200 to answer and incoming call or place an outgoing call. As previously explained, such control signals may be provided by any of user interface devices 124, 126, 128, and 132 through user interface adapter 122. Next, in step 420, CPU 110 determines that telephone handset 202 has a custom design. Therefore, CPU 110 retrieves information from ROM 116 or RAM 114 to determine how telephone handset 202 should be modified. This retrieved data is then provided to display adapter 136 which modifies a view of telephone handset 202 to be upturned such as that illustrated in telephone handset 202'. Next, it is determined whether or not the state of the control interface should again be modified in step 426. In the examples illustrated in FIGS. 2 and 3, the state of the control interface should not be modified again as this is merely a two-state control interface. However, if telephone handset had a third state, telephone handset 202 would remain in the second stage until control signals were received to modify the state of the control signal again.

The methodology for the present invention may be also represented as pseudo code. Such as pseudocode representation for displaying objects having custom designed control interfaces is provided below.

---

Pseudocode

View Layout Data
{
    Current scaling factor
    Control A custom designed image data -continued

| Pseudocode |
| --- |
| Control A location and size within the view |
| Control B custom designed image data |
| Control B location and size within the view |
| More controls . . . |
| } |
| Control custom designed image data |
| } |
| State 1 image data |
| State 2 image data |
| State 3 image data |
| May be more states image data . . . |
| Image data original size (common to all states) |
| } |

Additionally, pseudocode for redrawing a control interface in a view after the control state has been modified in response to a user input is provided below.

| Pseudocode |
| --- |
| If state of control has changed |
| { |
| Obtain new state from control's model |
| Fetch image data corresponding to the new state |
| Fetch cwTent scaling factor of the view |
| Compute size and location of control within the view |
| Scale image data accordingly |
| Display image data in view |
| } |

By now it should be apparent that there has been provided a data processing system and methodology for displaying a realistic custom designed control interface on an object on the display device. There are many additional configurations for implementing the invention described above. For example, the present invention is not limited to the telephone application illustrated in FIGS. 2 and 3. Rather, the present invention may be used and utilized in any situation in which the ready-made control interfaces available in a user interface toolkit of a development system are not fully descriptive or intuitive in a certain application. Such other applications may include a container of multi-media data represented as a book. In such a book metaphor, contents would be presented on pages that a user can effectively "flip" by clicking on page comers and tabs. Another example of such an application would be a CD-ROM drive metaphor implemented by a CD case which carries realistic controls for the use a CD-ROM drive. Additionally, it should be noted that the control interface implemented herein may be more than two states. Therefore, the present invention should not be limited to a two-state control interface.

Furthermore, while there have been described herein the principles of the invention, it is to be clearly understood to those skilled in the art that this description is made by way of example only and not as a limited to the scope of the invention. Accordingly, it is intended, by the appended claims, to cover all modifications of the invention which fall within the true spirit and scope of the invention.

What is claimed is:

1. A data processing system, comprising:

a user interface for receiving a plurality of control inputs for selectively enabling a first one of a plurality of applications, wherein the first one of the plurality of applications has an object representation and a first control interface;

a first memory for storing a first plurality of data values corresponding to a standard configuration of the first control interface, wherein the first plurality of data values corresponds to each of the plurality of applications;

a second memory for storing a second plurality of data values corresponding to a custom configuration of the first control interface, wherein the second plurality of data values corresponds to a portion of the plurality of applications;

a data processor, comprising a central processing unit, wherein the central processing unit is coupled to the first memory for receiving the first plurality of data values and is coupled to the second memory for receiving the second plurality of data values, the central processing unit detecting the first control interface of the object representation and selectively providing one of the first plurality of data values and the second plurality of data values to indicate a visual representation of the first control interface; and a display device coupled to the central processing unit for receiving one of the first plurality of data values and the second plurality of data values, the display device displaying the first control interface in the standard configuration in response to the first plurality of data values and displaying the first control interface in the custom configuration in response to the second plurality of data values, wherein the custom configuration excluded from an interface toolkit of a development system of the data processing system, and wherein the first control interface changes appearance when changing from the standard configuration to/from the custom configuration.

2. The data processing system of claim 1 wherein the first plurality of data values is provided by a development system of the data processing system.

3. The data processing system of claim 1 wherein the portion of the plurality of applications corresponds to a single application.

4. The data processing system of claim 1, wherein the standard configuration is a configuration included in an interface toolkit of a development system of the data processing system.

5. The data processing system of claim 1 wherein the application is a telephony application and the first control interface is a custom two-state control interface.

6. The data processing system of claim 5 wherein the central processing unit detects the custom two-state control interface and provides the second plurality of data values.

7. The data processing system of claim 6 wherein the visual representation of the first control interface is a telephone handset.

8. The data processing system of claim 1 wherein the user interface receives a plurality of control inputs for selectively controlling operation of the first application, the plurality of control inputs selectively placing the first control interface in one of a first state and a second state.

9. The data processing system of claim 1 wherein the central processing unit selects the second plurality of data values when the first one of the plurality of applications is a real-world application and the object representation is a metaphor for a real-world object.

10. A method for operating a data processing system, comprising the steps of:

receiving a first plurality of control inputs at a user interface for enabling a first one of a plurality of applications having a first control interface for performing a first control function which transitions from a first control state to a second control state;

enabling a central processing unit to detect when the first control interface is a standard control interface corresponding to the first control state, the central processing unit being coupled to the user interface;

retrieving a first plurality of data values from a development system standard toolkit to display the first control interface as the standard control interface;

receiving a second plurality of control inputs at the user interface to enable the first control interface to transition from the first control state to the second control state;

modifying an appearance of the first control interface on a display device to indicate the first control interface has transitioned from the first control state to the second control state; and retrieving a second plurality of data values from the memory to display the first control interface as the custom control interface.

11. A program storage device readable by a machine, tangibly embodying a program of instructions executable by the machine to perform method steps for providing custom control interfaces in a data processing system, said method steps comprising:

receiving a first plurality of control inputs at a user interface for enabling a first one of a plurality of applications having a first control interface for performing a first control function which transitions from a first control state to a second control state;

enabling a central processing unit to detect when the first control interface is a standard control interface corresponding to the first control state, the central processing unit being coupled to the user interface;

retrieving a first plurality of data values from a development system standard toolkit to displav the first control interface as the standard control interface;

receiving a second plurality of control inputs at the user interface to enable the first control interface to transition from the first control state to the second control state;

modifying an appearance of the first control interface on a display device to indicate the first control interface has transitioned from the first control state to the second control state; and retrieving a second plurality of data values from the memory to display the first control interface as the custom control interface.

* * * * *

UNITED STATES PATENT AND TRADEMARK OFFICE
CERTIFICATE OF CORRECTION

PATENT NO. : 6,097,386
DATED : August 1, 2000
INVENTOR(S) : Didier Daniel Bardon, et al.

It is certified that error appears in the above-identified patent and that said Letters Patent is hereby corrected as shown below:

Column 9, Line 28 after "Fetch", replace "cwTent" with --current--

Signed and Sealed this

Twenty-second Day of May, 2001

Attest:

NICHOLAS P. GODICI

*Attesting Officer*   *Acting Director of the United States Patent and Trademark Office*